May 21, 1963  P. E. GOYENECHE  3,090,127
ANGLE INDICATOR IN COMBINATION WITH SINE BARS AND THE LIKE
Filed Sept. 30, 1958  4 Sheets-Sheet 1
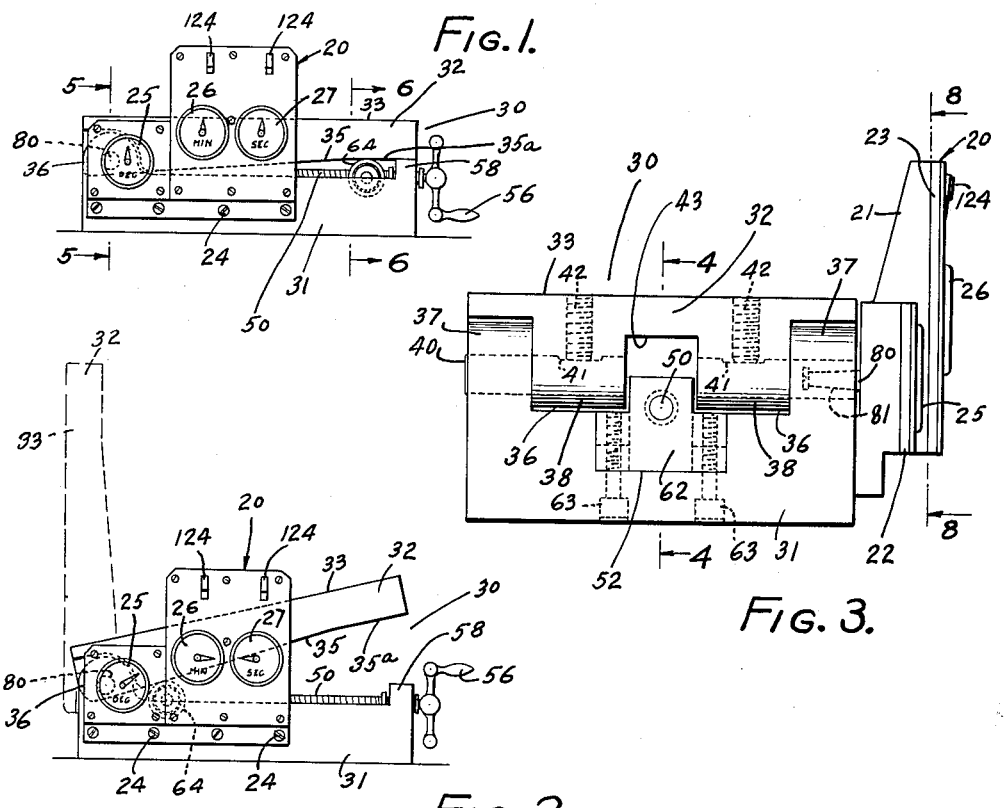
FIG. 1.
FIG. 3.
FIG. 2.
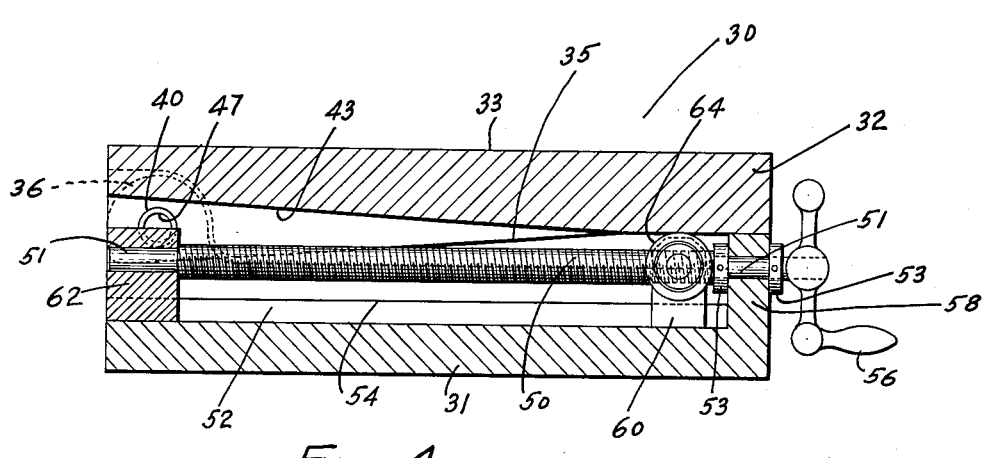
FIG. 4.
INVENTOR.
PRIMITIVO E. GOYENECHE
BY
Haseltine + Wovel
ATTORNEY May 21, 1963  P. E. GOYENECHE  3,090,127
ANGLE INDICATOR IN COMBINATION WITH SINE BARS AND THE LIKE
Filed Sept. 30, 1958  4 Sheets-Sheet 2
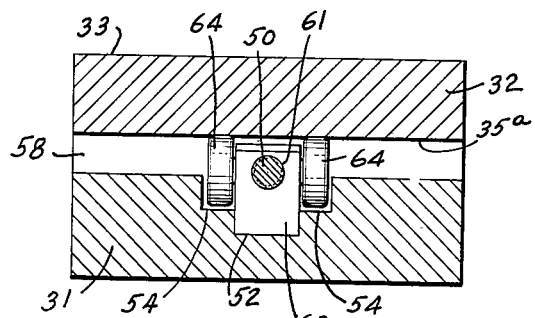
FIG. 6.
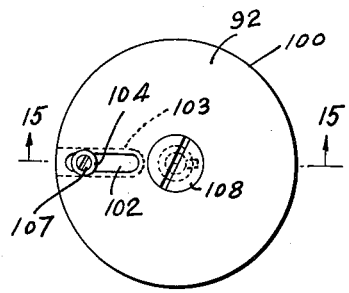
FIG. 14.
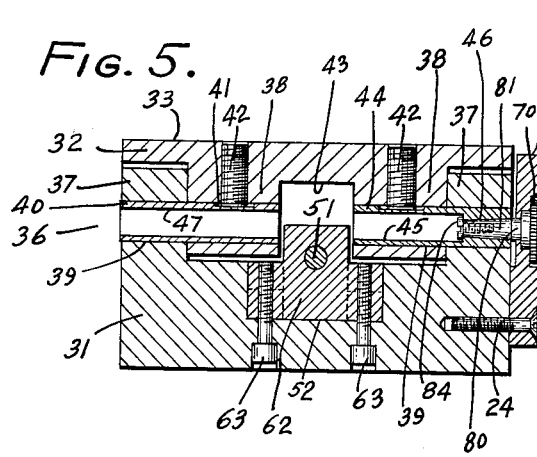
FIG. 5.
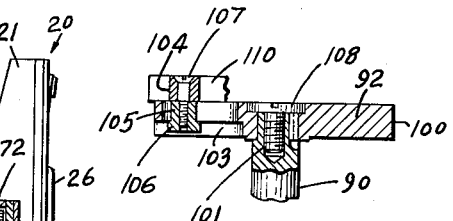
FIG. 15.
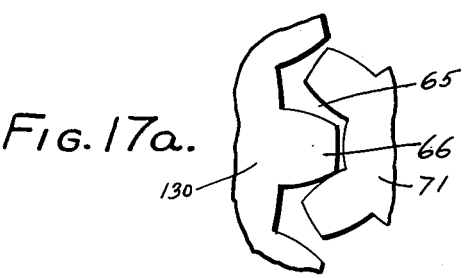
FIG. 17a.
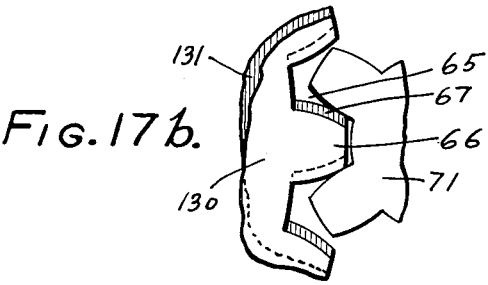
FIG. 17b.
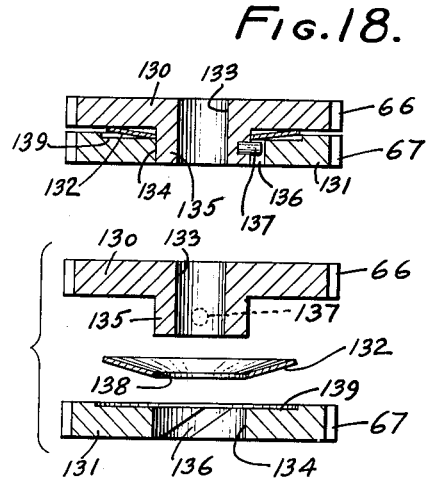
FIG. 18.
FIG. 19.
INVENTOR.
PRIMITIVO E. GOYENECHE
BY Huebner + Worrel
ATTORNEY May 21, 1963 P. E. GOYENECHE 3,090,127
ANGLE INDICATOR IN COMBINATION WITH SINE BARS AND THE LIKE
Filed Sept. 30, 1958 4 Sheets-Sheet 3

INVENTOR.
PRIMITIVO E. GOYENECHE
BY
Huebner & Worrel
ATTORNEY

May 21, 1963   P. E. GOYENECHE   3,090,127
ANGLE INDICATOR IN COMBINATION WITH SINE BARS AND THE LIKE
Filed Sept. 30, 1958   4 Sheets-Sheet 4
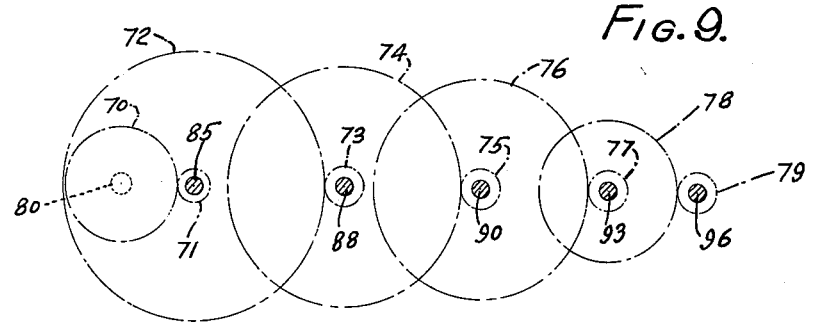
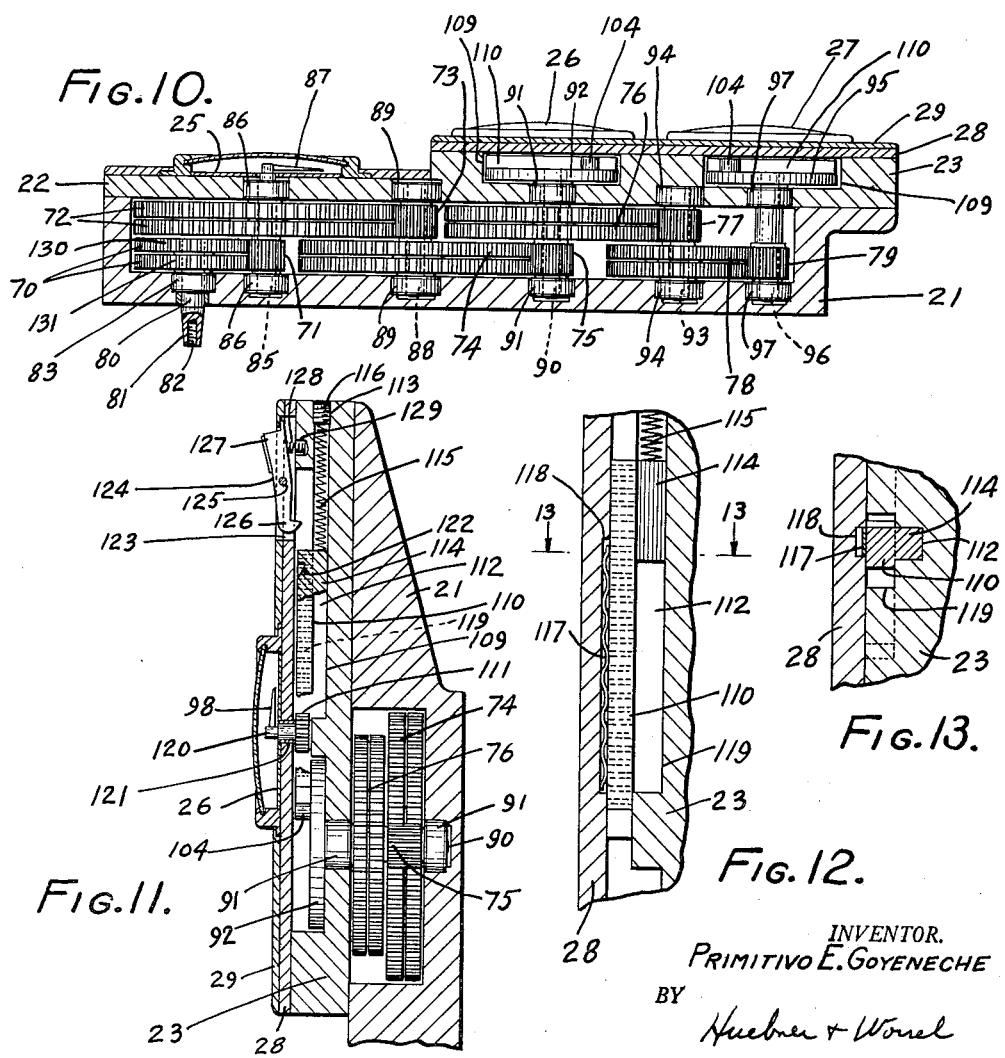
INVENTOR.
PRIMITIVO E. GOYENECHE
BY
Huebner + Worrel
ATTORNEY United States Patent Office 3,090,127
Patented May 21, 1963

3,090,127
ANGLE INDICATOR IN COMBINATION WITH SINE BARS AND THE LIKE
Primitivo E. Goyeneche, 5505 Inglewood Blvd., Los Angeles, Calif.
Filed Sept. 30, 1958, Ser. No. 764,344
2 Claims. (Cl. 33—174)

This invention relates generally to angle indicating instruments adapted to measure and register angles in terms of degrees, minutes, and seconds and, particularly, to an improved sine bar employing my angle indicator.

While the major description of my angle indicator will be given in conjunction with an improved sine bar, it is to be understood from the outset that my angle indicator can be attached to other instruments which may be used to measure angles or other quantities capable of being registered on interrelated dials.

As is more or less well known, the use of sine bars to set up work pieces at a given angle or to measure angles requires an accurate surface or master plate and a set of gage blocks, all of which are comparatively expensive and must be treated and handled with great care to preserve their accuracy. Furthermore, the use of the surface plate and the gage blocks is limited generally to setting up or measuring angles in degrees and minutes only. Say it is desired to set up an angle of 31° 20' 15" using the standard five inch sine bar. When looking up the height at which the elevated end of the bar is to be set in a standard handbook, such as Machinery's Handbook, 14th edition, page 1124, the constant for 31° 20' is found to be 2.6001 and the constant for 31° 21' is 2.6013. No seconds constant is given. To find the constant for 31° 20' 15" it will be necessary to interpolate between the values given. Thus for 15", ¼ of .0012=.0003; the value desired then being 2.6004. With the usual standard set of "Jo-blocks" or Johnanson gage blocks, it would be possible to set up 2.6000 without difficulty but practically impossible to set up the value of 2.6004.

The object of my invention, therefore, is to provide an angle indicator or angle registering device which, when used with angle measuring instruments, is adapted to accurately register minutes, degrees, and seconds, or any other form of angular measurement indications.

Another object of my invention is to provide an accurate angular indicator which in conjunction with a sine bar type of instrument will obviate the necessity of using auxiliary aids such as expensive surface plates and gage-blocks.

Other and further objects and advantages of my invention will appear with reference to the following description and drawings wherein like characters are used to denote like parts throughout the several views and wherein:

FIGURE 1 is an elevation showing my angle indicator as installed on my improved sine bar;

FIG. 2 is another elevation showing the upper movable plate in various positions;

FIG. 3 is an end view of the device shown in FIG. 1;

FIG. 4 is an elevation in cross-section taken on the line 4—4 of FIG. 3;

FIG. 5 is a cross-sectional view taken on the line 5—5 of FIG. 1;

FIG. 6 is a cross-sectional view taken on the line 6—6 of FIG. 1;

FIG. 9 is a diagrammatic sketch of the gearing arrangement in the angle indicator;

FIG. 10 is a cross-sectional plan view taken on the broken line 10—10 of FIG. 7;

FIG. 11 is a cross-sectional view taken on the line 11—11 of FIG. 7;

FIG. 12 is a cross-sectional view showing certain details of my invention;

FIG. 13 is a partial cross-section taken on the line 13—13 of FIG. 12;

FIGS. 14 and 15 illustrate a detail of my invention, FIG. 15 being taken on the line 15—15 of FIG. 14;

Figure 7:
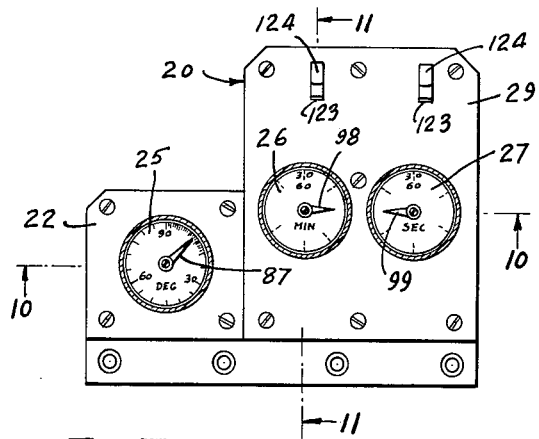
FIG. 7 is an enlarged elevation of my angle indicator.

FIGS. 17a, 17b, 18, and 19 illustrate the anti-backlash gear used in my invention.

With reference to FIGS. 1 to 6 inclusive, my angle indicator 20 is shown installed on one side of my improved sine bar 30. The latter comprises a lower block or portion 31 and an upper, moveable plate 32. Plate 32 is hinged to the block 31 at its leftward end by hinge 36 and may be elevated substantially through ninety degrees until its upper face 33, which was initially horizontal, assumes a vertical position as shown in phantom in FIG. 2.

Hinge 36 may be formed by the matching together of upwardly extending shaped portions 37 formed on lower block portion 31 and downwardly extending shaped portions 38 on upper plate 32. These shaped portions 37 and 38 are provided with matching bores 39 through which hinge pins 40 and 44 are inserted. These hinge pins 40 and 44 are provided with flats 41 to receive the set screws 42 which are suitably inserted into the upper plate 32. Thus, hinge pins 40 and 44 are securely held in place and prevented from any transverse movement.

The elevating mechanism or elevator for the upper plate 32, as shown best in FIG. 4, comprises a screw 50 having reduced diameter ends 51, a removable handle 56, and a traveling, roller supporting block 60. Lower block 31 is provided with a stepped or shouldered channel 52 which extends longitudinally and centrally of the block 31 from its upwardly extending screw support 58 to its other end. As shown, this support 58 is provided with a bore to accept the reduced diameter end 51 of the screw 50. Collars 53 are pinned to the end 51 on either side of support 58 so as to prevent screw 50 from having any longitudinal movement.

Screw support block 62 is located in the left end of channel 52 and is secured therein by screws 63. This support block 62 is provided with a centrally located bore to accept the other reduced diameter end 51 of the screw shaft 50 and thus serves as a support for the leftward end of screw shaft 50 as well as a stop to prevent roller block 60 from being forced out of the channel.

Roller block 60 is provided with a threaded bore 61 to accept the threaded screw shaft 50. Rollers 64 are carried by roller block 60 and are intended for a purpose to be described hereinafter. These rollers 64 may be carried by block 60 in any suitable fashion, preferably by shouldered screws (not shown) threaded into the side of block 60.

Upper plate 32 is provided with a lower inclined surface 35 which inclines downwardly to the left as shown in FIGS. 1, 2, and 4. This inclined surface 35 is provided with a longitudinal slot or channel 43 centrally disposed thereof (FIGS. 3, 5). This slot 43 is necessarily furnished so that the upper plate will clear block 62 when it is elevated into the 90° position. It should be noted that the lower surface 35 of the plate 32 comprises an inclined section 35 and a horizontal portion 35a. Obviously, the horizontal portion 35a is required so that plate 32 may assume a true horizontal position.

In operation, assuming the screw shaft 50 to be threaded right-handedly, as the handle 56 is turned clockwise, the roller block 60 will move to the left. The rollers 64 are so proportioned that they will not quite touch the lower surface 35a when the block 60 is in the right hand position, as shown in FIG. 4. As the block 60 is moved to the left in its channel 52, the rollers 64 contact the inclined surfaces 35 and thus gradually elevate the plate 32 from the 0° or horizontal position to the 90° or vertical position. It should be noted here that support block 62 may be so proportioned that it acts as a limit stop for roller block 60, thus controlling the designed angle of elevation, say a desired 80° or less. Also, handle 56 is preferably detachable so as to prevent unwarranted or inadvertent change in the desired setting as well as to be removed out of the way of a possible machining operation.

Normally, as the roller block 60 is moved to the right by the counterclockwise movement of the handle 56, the upper plate 32 will follow the rollers 64 by gravity. At extreme anges of elevation, however, particularly if a work piece is secured to the upper surface of plate 32, it may be necessary to assist plate 32 manually until the center of gravity of the plate and the work piece, combined, is beyond the 90° elevation after which the plate will follow the rollers by gravity.

It should be understood that the rollers may be made plainly of hardenable material or may be of any type of roller or ball bearing. Also, it should be clear that while the roller block and roller arrangement may be as shown, say in FIG. 6, it could also be provided so that the rollers would roll on the shoulders 54 of channel 52, and the bottom surface of block 60 would clear the bottom of channel 52. Also, conceivably, in larger sine bars, channel 52 would not be shouldered, and the rollers 64 would ride on the upper horizontal surface of the block 31.

Figure 8:
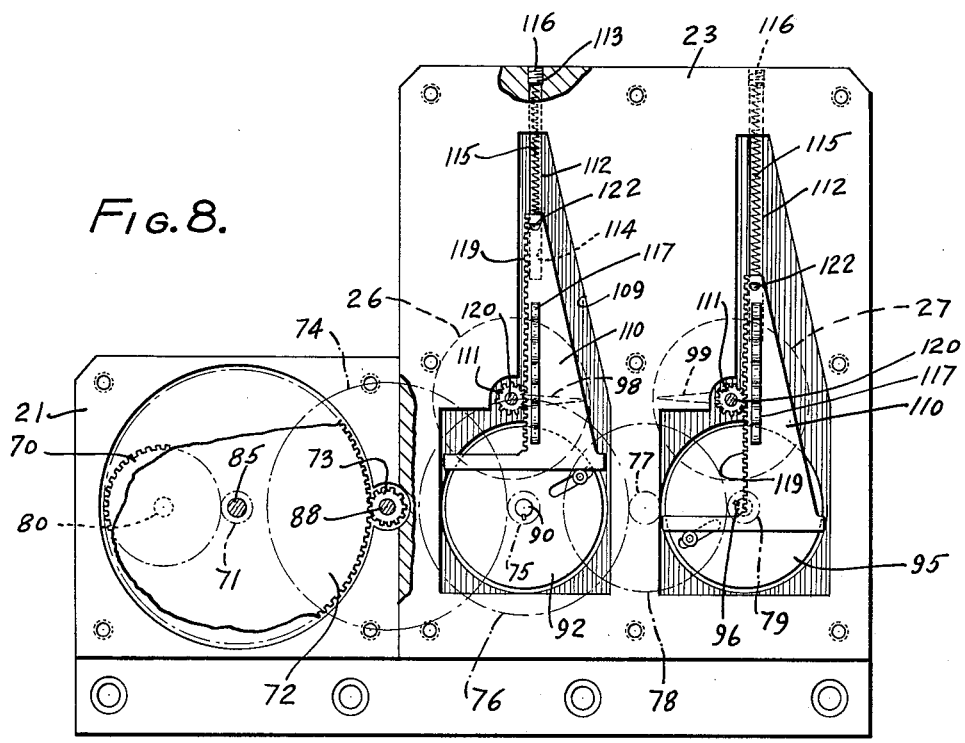
FIG. 8 is a cross-sectional elevation taken on the line 8—8 of FIG. 3.

The angle indicator 20 comprises a main casing 21 and main covers 22 and 23. The main casing 21 may be secured to the lower portion or block 31 of the sine bar by screws 24 as shown in FIG. 5. As indicated in FIG. 8, four such screws 24 may be used. It will be noted generally that casing 21 and main covers 22 and 23 serve to house the operating mechanism, furnish bearing supports for the various gear shafts, and support the various dials with their bezels and transparent covers. As shown in FIG. 7, cover 22 supports the degree registering dial 25, and cover 23 similarly carries minutes dial 26 and seconds dial 27.

With reference generally to FIGS. 9 and 10, the gear train of my angle indicator mechanism comprises the following gears: driving gear 70; first pinion 71; first driven gear 72; second pinion 73; second driven gear 74; third pinion 75; third driven gear 76; fourth pinion 77; fourth driven gear 78; and fifth pinion 79. While it is understood that various gear ratios may be used for different purposes, the gears used in my angle indicator-sine bar combination utilizes gears with the following members of teeth; driving gear 40; first pinion 10; first driven gear 100; second pinion 10; second driven gear 90; third pinion 10; third driven gear 80; fourth pinion 8; fourth driven gear 60; and fifth pinion 10. Thus, as will be described more fully hereinafter, as gear 70 moves through one-fourth of a revolution, pinion 71 and first driven gear 72 will move through one revolution; pinion 75 and third driven gear 76 will move through 90 revolutions; and pinion 79 will move through 5400 revolutions. In other words, as gear 76 moves through one revolution, pinion 79 will move through 60 revolutions.

As will be noted from FIG. 10, driving gear 70 is secured to shaft 80 which shaft is provided with a tapered portion 81 and a threaded bore 82. Shaft 80 is supported by bearing 83 which is recessed into casing 21. With reference to FIG. 5, hinge pin 44 is provided with a main cylindrical bore 45 and an axially concentric tapered bore 46. The latter bore is tapered to receive the tapered portion 81 of shaft 80 and the latter is locked into place by the screw 84. Since, as previously explained, hinge pin 44 is locked to the upper plate 32 of the sine bar, driving gear 70 is constrained to move therewith and initiates the angular indication generated by the movement of upper plate 32 with relation to the horizontal lower portion 31. Hinge pin 40 may be provided with a central bore 47 for the insertion of screw 84 prior to the placement of screw support block 62. Otherwise, if the hinge pin 40 is solid, the screw 84 would have to be inserted before pin 40 is inserted into the bores 39 of the portions 37 and 38.

With reference to FIG. 10 again, first driven gear 72 and first pinion 71 are fixed to shaft 85 which is rotatably supported in bearings 86 which are recessed into casing 21 and cover 22. Shaft 85 also carries degree pointer 87 which is secured non-rotatably thereto. Second pinion 73 and second driven gear 74 are likewise secured to shaft 88 which is rotatably supported in bearings 89. Third pinion 75 and third driven gear 76 are secured to shaft 90 which is rotatably supported by bearing 91. Shaft 90 carries cam plate 92 which is fixedly secured thereto and rotates with its supporting shaft. Fourth pinion 77 and fourth driven gear 78 are fixed to shaft 93 which is rotatably supported in bearings 94. Lastly, fifth pinion 79 and cam plate 95 are secured to shouldered shaft 96 and are constrained to rotate therewith. Bearings 97 rotatably support shaft 96. Note that bearings 86, 89, 91, 94, and 97 may be fashioned of bronze or other bearing materials or may be any type of roller, ball, or other type of anti-friction bearings as may be adapted to the purpose.

Thus, so far as shown, the angular movement of upper plate 32 with relation to the lower portion 31 directly activates driving gear 70 which, in turn, causes the controlled movements of degree pointer 87 and cam plates 92 and 95. For each complete revolution of degree pointer 87, cam plate 92 wil revove 90 times and cam pate 95, 5400 times. In other words for each revolution of cam plate 92 cam plate 95 will revolve 60 times.

The mechanism which transmits the rotary motion of cam plate 92 to the minutes pointer 98 will now be explained. Inasmuch as this mechanism is identical to that used to transmit the rotary motion of cam plate 95 to the seconds pointer 99 description of one will suffice for the other.

Referring to FIGS. 8, and 11 to 15, cam plate 92 comprises a circular disc 100 which may be of any suitable material. Disc 100 is provided with a radial slot 102 having a mortised portion 103 on the side of the disc toward its supporting shaft 90. Cam roller 104 is rotatably supported on the outward face of disc 100 by means of the shouldered nut 105 and shouldered screw 107. Nut 105 fits snugly into radial slot 102 and its head portion 106 fits into the mortise 103. By means of this nut and screw roller 104 may be located at any selected place along the slot 102. The purpose of this radial adjustability of cam roller 104 will appear shortly. Disc 100 may be secured to shaft 90 as shown in FIG. 15. Here shaft 90 is provided with a threaded bore 101 which receives flat-headed screw 108. Circular disc 100 is provided with a central bore to receive the reduced end of shaft 90 and a recess concentric with said bore to receive the head of screw 108. Circular disc 100 may be further keyed to shaft 90 as indicated or may be secured thereto in such manner as to prevent relative rotation of the disc and the shaft.

As shown in FIGS. 8, and 10 to 13, inclusive, main cover 23 is provided with a recess 109 to receive cam plate 92, T-rack plate 110, and pointer shaft pinion 111. Recess 109 is provided with a vertical keyway 112 terminating in an upper threaded bore 113. T-rack plate 110 is provided with a key 114 which slides in keyway 112. Thus the T-rack plate 110 is confined to vertical motion only and cannot tip or move laterally. Threaded bore 113 is axially aligned with the longitudinal axis of keyway 112 and receives compression spring 115. This spring may be inserted through the upper end of the cover 23 until it rests on top of the T-rack plate. Set screw 116 is then inserted into the threaded portion of bore 113 to retain the spring 115 as well as to adjust its force on its associated T-rack plate. As will be explained more fully, this spring is utilized for keeping the T-rack plate in contact with its associated cam roller under certain conditions of operation.

In order to restrain or control the vertical motion of the T-rack plate and to keep its key 114 snugly in the keyway 112, flat spring 117 is provided. This flat spring is held in a narrow, vertical recess 118 which is formed or machined into the auxiliary cover 28. As shown clearly in FIG. 12, this flat spring 117 bears against the outer face of the T-rack plate for the purpose mentioned above.

The lower horizontal portion of the T-rack plate 110, under certain conditions of operation, bears on the cam roller 104, as shown in FIG. 8. When free to move vertically, the T-rack plate will follow the cam roller as it moves in a circular orbit. Spring 115 presses down on the T-rack plate and keeps it in contact with the cam roller 104. It should be noted here that the extent of vertical motion of the T-rack plate is dependent upon the radial location of the cam roller 104 in its slot 102. This feature of adjustability will be explained more fully hereinafter.

The vertical portion of the T-rack plate is provided with a rack 119 which meshes with the minutes pointer shaft pinion 111. As shown in FIG. 11, this pinion is fixedly secured to minutes pointer shaft 120 which is rotatably supported by a bearing 121 suitably recessed into auxiliary cover 28. The inner end of shaft 120 may be suitably supported by a bearing recessed into main cover 23 (not shown). The outer end of shaft 120 fixedly supports minutes pointer 98. In other words, pointer 98, shaft 120, and pinion 111 are constrained by suitable means to move or rotate together.

Pinion 111 may be provided with any number of teeth. In this particular embodiment, a pinion with 10 teeth is used. Due to the variations in size incident to the manufacture of the most precise pinion, gears, and racks, it is necessary to have some means of adjustment whereby the vertical motion of the rack, either up or down, will move the pinion and its associated pointer one revolution and one revolution only. This adjustment is provided by moving the cam roller 104 in its slot 102 until the corresponding vertical motion of the T-rack plate will cause the pinion to rotate one complete revolution only. Thus, as the cam roller 104 moves clockwise, say, from its extreme upper portion to its extreme lower position, the T-rack plate moves downward and pinion 111 revolves clockwise one revolution only. Then, as the cam roller, still moving clockwise, ascends to its upper extreme position, the T-rack plate moves upward and pinion 111 revolves counterclockwise one complete revolution.

The upper or apex end of T-rack plate 110 is furnished with an indent 122 as indicated in FIGS. 8 and 11. This indent is located on the outer surface of the T-rack plate. Auxiliary cover 28 is provided with a slot 123 (FIG. 7) into which slot is pivoted a spring catch 124 (FIG. 11). This spring catch 124 is held in slot 123 by pivot pin 125. Pivot pin 125 may be secured to auxiliary cover 28 in any suitable manner. One manner of fix of this pivot pin would comprise corresponding horizontal notches in auxiliary cover plate 28 and second auxiliary cover plate 29. When cover 29 is secured suitably to cover 28, pivot pin 125 would be securely held across slot 123 and through the spring catch 124.

Spring catch 124 has a shaped lower end 126 which is adapted to engage the indent 122 in the upper or apex end of the T-rack plate. The upper end 127 of the spring catch is shaped to protrude through the slot 123 slightly beyond the outer face of the second auxiliary cover 29. The upper end of the catch is normally held in this protruding position by the pressure of compression spring 128 which is recessed into the main cover 23 at 129. In operation, as cam roller 104 moves upward, it moves the T-rack plate upward. At the limit of upward travel of roller and plate, the indent 122 is positioned opposite the shaped lower end 126 of the spring catch and that part enters the indent and thus locks the T-rack plate at its extreme upward travel limit. Thereafter, the T-rack plate is held stationary until, at a selected time, the upper end 127 of the spring catch is manually pushed in and the plate is released. This operation will be explained more fully later.

As should be obvious by this time, the operational success of my angle indicator is predicated on the precision fitting of parts and the absolute lack of play in the gear train. The fittings of shafts, bearings, and other moving parts is relatively simple but the total elimination of backlash or play between adjacent mating teeth in gearing has heretofore been unsuccessful in other types of similar instruments and has prevented their wholesale adoption in the engineering trades and instrumentation fields. By the use of my novel three-part gear, to be described, I propose to eliminate all such backlash and to prevent its occurrence during the life of the instrument.

With reference to FIGS. 17a, 17b, 18, and 19, my three-part, anti-backlash gear comprises a hub-bearing portion 130, a cam-slotted portion 131 and a dished spring member 132. The two portions 130 and 131 are of equal diameter and are furnished with an equal number of similar shaped teeth. Hub-bearing portion 130 is provided with a bore 133 which will accept its associated shaft in a suitable manner, usually a light press fit. Cam-slotted portion 131 is provided with a bore 134 which will fit closely, yet rotatably, over hub 135 of portion 130. Cam-slotted portion 131 is further provided with a slot 136 machined into the bore 143. This slot 136 may be straight, as shown, or curved. The axis of the slot 136 is at an angle with relation to the axis of the bore 134. A pin 137 is fixed into the outer side of the hub 135 which pin is inserted into and is associated with the cam slot 136. The dished spring member 132 is also provided with a bore 138 which fits snugly over the hub 135. The spring fits into a slight recess which is formed on the interior surface of the portion 131. Thus, when the parts are assembled with the spring member between the two toothed portions, the latter can be brought as close together as may be desired by the exertion of a moderate pressure. When the two toothed portions are thus brought close together, the teeth of the two portions match. If the hub portion is held stationary and the cam slotted portion is allowed to move axially away from the hub portion under the expanding influence of the previously compressed spring, obviously, due to the action of the pin in the cam slot, the portion 131 will tend to turn or rotate with respect to the hub portion and the teeth will no longer match.

With reference now to FIGS. 10, 17a and 17b, and one gear assembly 70 and 71, gear 70 comprising a hub portion 130, spring 132, and cam-slotted portion 131 is assembled with its matching teeth placed into a tooth space 65 of pinion 71. Hub portion 130 is secured to the shaft 80 so that it rotates therewith and also would be prevented from moving axially of the shaft 80. Cam-slotted portion 131 would be assembled so as to have a slight play between the hub portion 130 and the bearing 83. If the teeth 66 and 67 of the anti-backlash gear assembly 70 did not exactly fill the tooth space 65 of the pinion 71, as shown in FIG. 17a, cam-slotted portion 131 would move axially downward and the mismatch of the teeth 66 and 67 thus produced would fill the tooth space 65 of pinion 71 and no backlash between the gear and pinion could occur. As the teeth of the mating gears wear down or become thinner and the teeth spaces of the pinion 71 become larger, the portions 130 and 131 would adjust themselves so that their mismatching teeth would always fill the teeth spaces of pinion 71. It should be realized that the relative motions of the gear portions would be very small as would the degree of tooth mis-match. It should also be noted that hub portions 130 may be secured by hard soldering, brazing, keying, or other suitable means to their respective shafts so as to prevent any relative motion between the two. As indicated in FIG. 10, gears 70, 72, 74, 76 and 78 are all similarly constructed to the three-part, anti-backlash gear described above. Also, pin 137 may be replaced with a suitable ball located in a recess in the hub portion.

Figure 16:
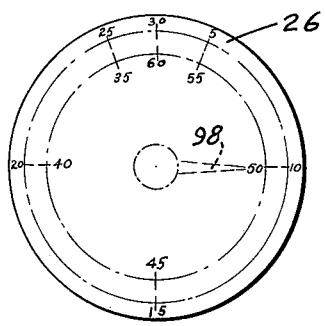
FIG. 16 is an enlarged view of either the minutes or seconds dials.

As shown in FIGS. 1, 2, and 7, my angle indicating instrument is fitted with three dials. Degree dial 25 may be graduated so as to indicate 90° for a complete revolution of degree pointer 87. These graduations should indicate preferably whole and half degrees for the purposes to be explained presently. Minutes and seconds dials 26 and 27 will be graduated somewhat similarly to each other as shown in FIG. 16.

The graduations for these two dials will be in two concentric outer and inner rows, each row covering a complete revolution of the pointer. Thus, assuming the pointer is moving in the clockwise direction, the outer row of graduations will register from 0' to 30', the 0' and 30' position of the pointer being represented by the same mark or graduation at the top of the dial. This clockwise revolution of the pointer from 0' to 30' represents the downward travel of the T-rack plate or one-half revolution of the cam plate 92, i.e., cam roller 104 moves clockwise from its extreme upper position to its extreme lower position as partially shown in FIG. 8. Now, as cam plate 92 and its roller 104 continue in their clockwise rotation, the T-rack slot is urged upwardly and the minutes pointer now rotates counter-clockwise from its vertically upward position at 30'. Hence, the inner row of graduations proceeds counter-clockwise from 30' to 60'. Thus, as cam plate 92 moves clockwise through 360° or one complete revolution starting with the cam roller 104 at its uppermost position, T-rack plate 110 moves downwardly at first and then upwardly; pointer 98, starting at the uppermost 0' position moves one complete revolution clockwise registering successively 5', 10', 20', etc. to 30'; and then, corresponding to the upward movement of the T-rack plate, the pointer moves one complete revolution counter clockwise registering successively 30', 35', 40', etc. to 60'. Note that cam plates 92 and 95 always rotate continuously in the same direction for a given direction of rotation of driving gear 70 (driving gear 70 rotating in one direction when the upper plate of the sine bar is being raised and in the opposite direction when the upper plate is being lowered) whereas for a complete registration of 60' or 60", the pinions 111 must make two complete revolutions, one counter clockwise and the other clockwise. Naturally, pointers 98 and 99 follow their pinions 111.

The minutes dial 26 is preferably graduated in minutes and half-minutes when followed by a seconds indicator. If the minutes indicator is used alone with the degree indicator, then the minutes dial could be graduated in minutes and tenths-minutes or even a smaller fraction. It should be emphasized here that my angle indicator can be used with just the first primary indicator and a second indicator or, as shown, a primary indicator followed by two secondary indicators, each of the secondary indicators registering selected fractions of that quantity indicated or registered by the primary indicator.

The seconds dial 27 is graduated in seconds and tenths-seconds or even smaller fractions depending on the degree of fineness of indication desired and the size of the dial. This dial is marked generally as that marking described in connection with the minutes dial; i.e., from 0" to 30" for one revolution of the seconds pointer in one direction and from 30" to 60" for one revolution of the pointer in the opposite direction. It will be apparent that this two-revolution movement of the minutes and/or the seconds pointer with the 0–30, and 30–60 graduation is an essential feature of my invention, resulting in comparatively wide spacing between the whole minutes and second graduations which, in turn, provides ample room for fractional graduations.

The operation of my angle indicator in combination with my improved sine bar will now be described.

Assume a work object is secured to the upper surface 33 of upper plate 32 and it is desired to machine the upper surface of the object to an angle of 30°—45'—27.5" with its lower or base surface. Handle 56 is turned clockwise causing roller block 60 to move to the left (FIG. 4) which, in turn, raises the upper sine bar plate 32. As the latter is tilted upward, gear 70 is rotated and the degree of inclination is registered on dial 25. As soon as gear 70 starts to rotate, obviously, cam plates 92 and 95 start to rotate in the same direction. As their associated cam rollers 104 reach their uppermost position, their associated T-rack plates reach the upper limit of their vertical travel and are locked into this upper position. Thereafter, as cam plates 92 and 95 continue to rotate, the T-rack plates are locked and do not follow their associated rollers 104. This feature is also an essential part of my invention. Obviously, as gear 70 is rotated, even though slowly, cam plates 92 and 95, due to the gearing, will revolve much faster; 95 faster than 92. If the T-rack plates were not locked in their uppermost vertical position, obviously, they would be raised up and down as rapidly as their cam plates are rotating which would result in rapid wear throughout the minutes and seconds registering mechanisms.

Handle 56 is operated, forcing roller block 60 to the left, until the degree pointer registers approximately halfway between the 30½" and the 31" marks on the degree dial. Then the spring catch 124 for the minutes T-rack plate is pressed inwardly, releasing its associated T-rack plate. The latter is forced downwardly by spring 115 until its lower horizontal edge comes in contact with its associated cam roller 104 on cam plate 92. Flat spring 117 exerts sufficient pressure against the face of the T-rack plate so that it slides gently down against the cam roller 104 rather than being forced down rapidly with a jar as would occur in the absence of flat spring 117.

At this point, the degree pointer is approximately halfway between the 30½° and 31° marks on the degree dial 25. The minutes pointer is registering in the lower left quadrant of the minutes dial, say at the 20'–40' graduation. With the degree pointer registering more than 30½°, we know that we are in that part of the cycle for the minutes registration where the minutes T-rack plate will be ascending and the minutes pointer will be rotating counter-clockwise. Hence, as we slowly turn handle 56, the minutes pointer will rotate counter-clockwise until we stop it just beyond the 45' graduation. The seconds T-rack plate is then released and it makes contact with its cam roller 104 on cam plate 95 as previously described in connection with the minutes registration. The seconds pointer now registers, say, at the 20"–40" graduation. With the minutes pointer registering between 45" and 45½", we know that we are in that part of the cycle for the seconds registration where the seconds T-rack plate will be descending and the seconds pointer will be rotating clockwise. Thus, we know that the proper registration is the 20" value rather than the 40" value. Then, as handle 56 is slowly turned, the seconds pointer will continue in its clockwise rotation until it is caused to register 27½" as per the original desire.

While I have shown and described one preferred embodiment of my improved sine plate and angle indicator with its novel anti-backlash gearing, it is to be understood that my angle indicator is highly adaptable to any system where angle indication is necessary or required and is not necessarily confined to the one use shown. Further, it should be understood that while many modifications of my invention may occur to those skilled in the art, it is intended that all such modifications shall be included in the scope of the appended claims wherein I claim:

1. An angle indicator for sine bars and the like having a lower base portion and an upper plate portion hinged thereto at one end whereby said upper plate portion may be disposed at an angle not exceeding ninety degrees to said lower base portion comprising, in combination:
- a first driving gear;
- means connecting said upper plate and said first driving gear;
- a moving degree pointer actuated by said driving gear;
- a fixed full circle dial associated with said degree pointer, said dial being graduated in degrees and selected fractions of a degree from 0° to 90°;
- a train of gears driven by said first driving gear;
- a first cam plate adapted to be driven by one of said train of gears, said cam plate bearing a radially adjustable cam roller;
- an inverted T-rack plate adapted to move vertically in response to the rotary motion of said cam roller;
- a pinion driven by said T-rack plate;
- a minute indicating pointer actuated by said pinion, said pointer making exactly one revolution in one direction for the downward vertical movement of said T-rack plate and exactly one revolution in the reverse direction for the upward vertical movement of said T-rack plate;
- a fixed full circle dial associated with said minute indicating pointer, said dial being graduated to read from 0 to 30 minutes and selected fractions of minutes for the one revoluton of the pointer in the one direction and from 30 to 60 minutes for one revolution of the pointer in the reverse direction;
- means comprising said radially adjustable cam roller for adjusting the vertical movement of said T-rack plate so that the minute indicating pointer will make only one complete revolution in either direction; and automatically operable detent means associated with said T-rack plate for detaining said T-rack plate at the limit of its upward vertical movement whereby as said cam plate continues to revolve in response to the rotation of said driving gear, said T-rack plate, said rack driven pinion, and said minute indicating pointer may be held motionless and manually operated means for releasing said detent means.

2. An angle indicator as claimed in claim 1 further characterized by having
- a second cam plate driven by the last one of said train of gears, said cam plate bearing a radially adjustable cam roller;
- a second inverted T-rack plate adapted to move vertically in response to the rotary motion of the cam roller on said second cam plate;
- a pinion driven by said second T-rack plate;
- a seconds indicating pointer actuated by said pinion, said seconds pointer making exactly one revolution in one direction for the downward vertical movement of said second T-rack plate and exactly one revolution in the reverse direction for the upward vertical movement of said second T-rack plate;
- a fixed full circle dial associated with said seconds indicating pointer, said dial being graduated to read from 0 to 30 seconds and selected fractions of seconds for the one revolution of the pointer in the one direction and from 30 to 60 seconds for one revolution of the pointer in the reverse direction;
- means comprising said radially adjustable cam roller on said second cam plate for adjusting the vertical movement of said second T-rack plate so that the seconds indicating pointer will make only one complete revolution in either direction; and automatically operable detent means associated with said second T-rack plate for detaining said T-rack plate at the limit of its upward vertical movement whereby as said second cam plate continues to revolve in response to the rotation of said driving gear, said second T-rack plate, its associated pinion and said seconds indicating pointer may be held motionless and manually operated means for releasing said detent means.

References Cited in the file of this patent

UNITED STATES PATENTS

| | | |
|---|---|---|
| 226,723 | Davidson | Apr. 20, 1880 |
| 603,504 | Fuller | May 3, 1898 |
| 1,060,466 | Leloup | Apr. 29, 1913 |
| 1,521,341 | Thacher | Dec. 30, 1924 |
| 1,619,799 | Rounds | Mar. 1, 1927 |
| 2,000,926 | Cox | May 14, 1935 |
| 2,056,948 | Bensen | Oct. 13, 1936 |
| 2,351,773 | Lovenston | June 20, 1944 |
| 2,495,609 | Semrau | Jan. 24, 1950 |
| 2,505,928 | Worby | May 2, 1950 |
| 2,517,667 | Holkenbrink | Aug. 8, 1950 |
| 2,669,027 | Wilson | Feb. 16, 1954 |
| 2,674,123 | Sooy | Apr. 6, 1954 |
| 2,703,458 | Fitzpatrick | Mar. 8, 1955 |
| 2,737,382 | Van Duyn | Mar. 6, 1956 |
| 2,775,041 | Pomernacki | Dec. 25, 1956 |